(No Model.)

J. W. CHAMPION.
HAND CORN PLANTER.

No. 474,721. Patented May 10, 1892.

WITNESSES:
Chas. Nida
C. Sedgwick

INVENTOR
J. W. Champion
BY Munn & Co
ATTORNEYS

THE NORRIS PETERS CO., PHOTO-LITHO., WASHINGTON, D. C.

UNITED STATES PATENT OFFICE.

JEREMIAH W. CHAMPION, OF ROCHEPORT, MISSOURI.

HAND CORN-PLANTER.

SPECIFICATION forming part of Letters Patent No. 474,721, dated May 10, 1892.

Application filed July 18, 1891. Serial No. 399,898. (No model.)

*To all whom it may concern:*

Be it known that I, JEREMIAH W. CHAMPION, of Rocheport, in the county of Boone and State of Missouri, have invented a new and useful Improvement in Hand Corn-Planters, of which the following is a full, clear, and exact description.

My invention relates to an improvement in hand corn-planters, and has for its object to provide an implement of simple and durable construction capable of being conveniently and expeditiously manipulated, and which will without fail feed the seed-corn from a hopper to the delivery end of the implement, from which it may be discharged as desired.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
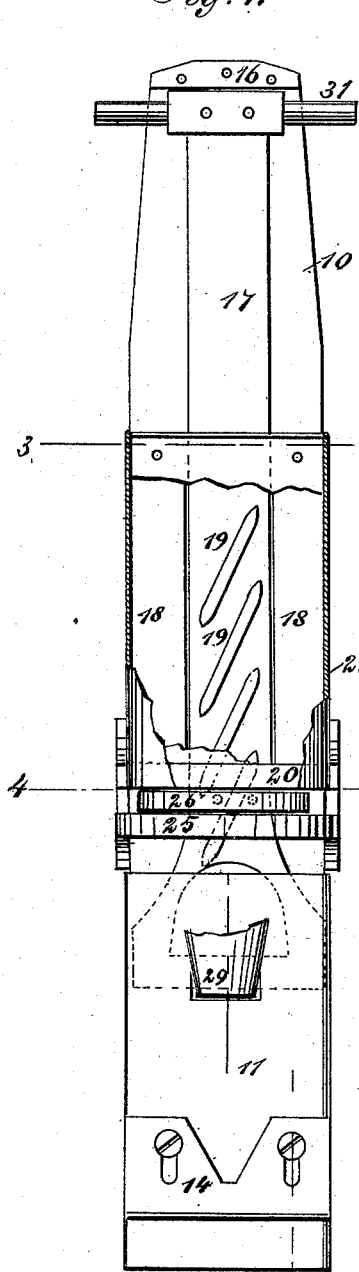
Figure 3:
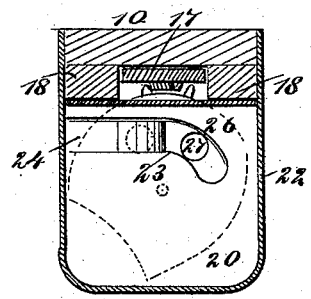
Figure 2:
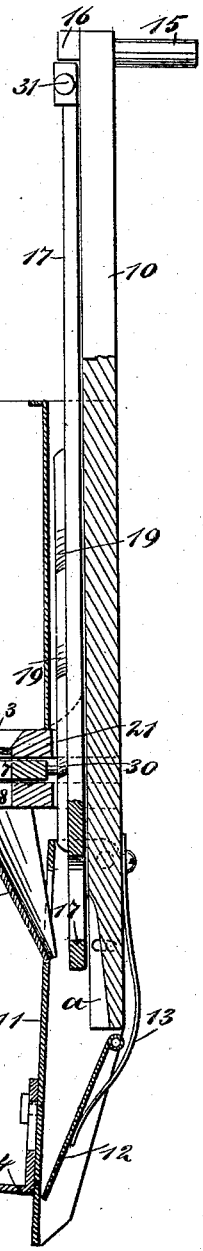
Figure 4:
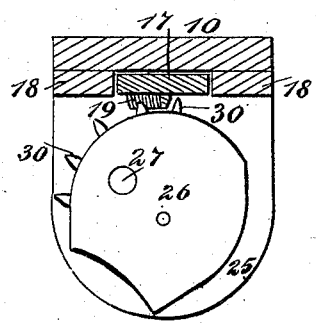

Figure 1 is a front elevation of the implement, the seed-box and the hopper being in section. Fig. 2 is a vertical section taken practically on the line 2 2 of Fig. 1. Fig. 3 is a transverse section taken practically on the line 3 3 of Fig. 1, and Fig. 4 is a similar section taken practically on the line 4 4 of Fig. 1.

The body of the implement consists of a back board or plate 10 of any desired length, the front lower end surface of which is concaved, as illustrated at *a* in Fig. 2, and a delivery-spout 11, attached to the front lower portion of the back board or plate, which delivery-spout is preferably secured to the sides of the back board or plate and is open at the top. The back of the delivery-spout below the lower end of the back board or plate is open and is inclined downwardly and forwardly to its lower edge, as is also best shown in Fig. 2; but the open rear surface of the spout is normally closed by a gate or door 12, which is hinged within the spout immediately above the lower end of the back board or plate. The lower end of the gate is held in engagement with the inner face of the front wall of the spout by a spring 13 of any approved construction, attached at one end to the back board or plate and having a bearing at its other end upon the gate. This gate 12 normally closes the delivery-spout and prevents any seed contained therein from dropping out. The lower end of the gate engages with the delivery-spout some little distance above the lower end of said spout, and upon the front of the spout a gage-plate 14 is adjustably attached, the said plate being preferably an angle-plate, and the object of this plate is to regulate the depth to which the seed is to be planted, as in planting the lower end or mouth of the delivery-spout is pressed into the ground until the horizontal member of the gage-plate engages with the latter. The body-plate is also provided at its upper end upon its rear side with a horizontal handle 15, whereby it is carried and held in position, and also upon its front face a stop-rib 16 is transversely secured at its upper end.

The slide 17 has vertical movement upon the front face of the back board or plate 10 and is located upon the center of said back board or plate, being guided in its movements by guide-strips 18, located one at each side of the center and extending longitudinally to a point between the center and the upper end, as is best shown in Fig. 1. The lower end of the slide 17, which is adapted to enter the delivery-spout 11, is made as wide as possible, extending nearly from side to side of the delivery-spout, and in order that the slide may be as light as possible the end thereof is preferably provided with an opening, as illustrated in Figs. 1 and 2. The enlargement of the lower end of the slide also prevents the slide from being drawn from its slideways. The slide is provided upon its front face with a series of diagonally-located ribs 19, the ends of which ribs are rounded off or pointed, as illustrated in Fig. 1. A horizontal platform 20 is secured to the front face of the back board, and this platform is provided with an opening 21, through which the slide passes. The platform constitutes the bottom of a receptacle 22, adapted to contain the seed, which receptacle may, if desired, be provided with a cover, and the receptacle is ordinarily made practically rectangular in cross-section, although it may be made round or of any other desired shape. The back of the receptacle 22 rests against the guide-strips 18. Consequently it does not interfere with the movement of the slide or the ribs 19 thereof.

The platform 20 or bottom of the receptacle is provided with a transverse opening 23, which extends from one side to a point near the center and then curves forward, as shown in Fig. 3. At the outer end of the opening 23 a strip 24 of leather, metal, or other material is secured, which strip extends forward and covers about one-half of the opening 23, the inner end of the strip projecting downward practically level with the lower edges of the opening. A second platform 25 is located beneath the bottom 20 of the receptacle and is spaced some distance therefrom. Between the upper platform or bottom of the receptacle and the lower platform 25 a disk 26 is pivoted, the said disk being adapted to have a laterally reciprocating or rocking movement. The disk has produced therein eccentrically an opening 27, extending through from side to side and adapted as a pocket for seed, and a similar opening 28 is made in the lower platform 25, and beneath this opening 28 a hopper 29 is attached to the platform, which hopper at its lower end extends within the delivery-spout. The disk 26 is provided with a number of horizontal teeth 30, and the disk is given its laterally-reciprocating movement by the teeth entering the spaces between the ribs 19 of the slide as the slide is drawn upward and downward. The slide is provided at its upper end with a handle 31 to facilitate its manipulation.

In the operation of the implement before the receptacle 22 is filled with seed, the slide 17 is pressed downward and the action of the ribs of the slide upon the teeth of the disk 26 will be such as to rotate the disk sufficiently in the direction of one side to carry its opening 27 beyond the covered portion of the opening 23 in the bottom of the receptacle, as shown in Fig. 3. When the disk is in this position, the lower platform forms a bottom for the disk-opening 27 and the said opening is filled with seed. When the seed is to be planted, the slide is drawn upward, which will rotate the disk in an opposite direction, and when the slide has been fully drawn upward the pocket 27 in the disk will be in registry with the opening 28 in the lower platform, and the seed will drop from the pocket through the said opening into the chute 29 and be delivered thereby into the delivery-spout. The seed cannot escape from the delivery-spout at this time, as the gate 12 is in a closed position. The delivery-spout of the implement is now pressed into the ground a sufficient distance—that is, up to the gage-plate 14—and the slide is pressed downward, bringing the pocket 27 in the disk in position to receive more seed, and the enlarged lower end of the slide is brought in engagement with the gate 12 and forces it out against the tension of its spring 13, thus permitting the seed to escape into the ground. This operation is continued until a sufficient quantity of seed has been planted.

By means of the several ribs on the slide and the several teeth on the disk the disk will be caused to make a half-turn at each movement of the slide, so as to produce a positive rotary feed and one that is exceedingly simple in its construction and applicable to any form of hand-planter.

In the operation of the feed when the disk 26 is rotated to deliver its seed the strip 24 in the bottom of the seed-receptacle will remove any surplus seed contained in the pocket or lying upon the surface of the disk, thus preventing the disk from becoming choked.

Having thus described my invention, I claim as new and desire to secure by Letters Patent—

1. In a hand-planter, the combination, with a seed-receptacle provided with an elongated opening in its bottom, said opening being curved forwardly, a clearance-strip covering a portion of said opening, and a slide having movement at the rear of the receptacle and provided upon its outer face with a series of diagonal ribs, of a platform located beneath the bottom of the receptacle and provided with a discharge-opening out of registry with the uncovered portion of the opening in the seed-receptacle, and a feed-disk pivoted between the platform and the bottom of the seed-receptacle, provided with a seed-pocket, and teeth secured in the periphery of the disk and engaged by the ribs of the slide when the latter is manipulated, whereby the seed-pocket of the disk is made to register alternately with the uncovered portion of the opening in the seed-receptacle and the discharge-opening in the platform beneath said receptacle, substantially as described.

2. A hand-planter consisting of a body board or plate provided with a delivery-chute at its lower end and a spring-controlled gate normally closing said chute, a slide held to reciprocate upon the body board or plate, having an enlarged lower end entering the delivery-chute and provided upon its outer face with a series of diagonal ribs, a seed-receptacle attached to the body board or plate in front of the slide, the bottom of the receptacle being provided with a transverse opening partially covered by a clearance-strip, said opening having its inner end curved forwardly, a platform located beneath the bottom of the said receptacle, having a discharge-aperture out of registry with the uncovered portion of the receptacle-opening, a chute located beneath the discharge-opening and entering the delivery-chute, a feed-disk pivoted beneath the seed-receptacle and the platform and provided with a seed-pocket, and teeth attached to the periphery of the disk, adapted for engagement with the ribs of the slide as the latter is reciprocated, as and for the purpose set forth.

JEREMIAH W. CHAMPION.

Witnesses:
J. M. MATHIS,
JAMES ABUALL.